United States Patent
Taherzadeh Boroujeni et al.

(10) Patent No.: US 11,595,944 B2
(45) Date of Patent: Feb. 28, 2023

(54) INDICATING A REFERENCE SIGNAL TRANSMISSION PRIOR TO RMSI PDCCH TRANSMISSION

(71) Applicant: QUALCOMM Incorporated, San Diego, CA (US)

(72) Inventors: Mahmoud Taherzadeh Boroujeni, San Diego, CA (US); Iyab Issam Sakhnini, San Diego, CA (US); Tao Luo, San Diego, CA (US); Jelena Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 53 days.

(21) Appl. No.: 17/249,852

(22) Filed: Mar. 16, 2021

(65) Prior Publication Data
US 2021/0297990 A1    Sep. 23, 2021

Related U.S. Application Data

(60) Provisional application No. 62/992,815, filed on Mar. 20, 2020.

(51) Int. Cl.
| | |
|---|---|
| H04W 72/00 | (2009.01) |
| H04W 72/04 | (2023.01) |
| H04L 5/00 | (2006.01) |
| H04W 72/044 | (2023.01) |

(52) U.S. Cl.
CPC ......... *H04W 72/005* (2013.01); *H04L 5/0051* (2013.01); *H04W 72/042* (2013.01); *H04W 72/046* (2013.01); *H04W 72/0493* (2013.01)

(58) Field of Classification Search
CPC ............. H04W 72/005; H04W 72/042; H04W 72/046; H04W 72/0493; H04L 5/0051; H04L 5/0053
See application file for complete search history.

(56) References Cited

U.S. PATENT DOCUMENTS

| | | | | |
|---|---|---|---|---|
| 2015/0373674 A1* | 12/2015 | Han | ......................... | H04L 5/001 370/329 |
| 2016/0128011 A1* | 5/2016 | Yang | .................... | H04L 27/2627 370/329 |
| 2019/0387412 A1* | 12/2019 | Kim | ...................... | H04L 5/0053 |

* cited by examiner

*Primary Examiner* — Kiet Tang
(74) *Attorney, Agent, or Firm* — Harrity & Harrity LLP/Qualcomm Incorporated

(57) ABSTRACT

Various aspects of the present disclosure generally relate to wireless communication. In some aspects, a user equipment (UE) may receive a physical broadcast channel (PBCH) communication from a base station (BS). The UE may identify, based at least in part on a determination that the PBCH communication indicates a reference signal that is to be transmitted prior to transmission of a remaining minimum system information (RMSI) physical downlink control channel (PDCCH) communication, one or more radio resources in which the reference signal is to be transmitted. The UE may monitor for the reference signal, from the BS, in the one or more radio resources prior to reception of the RMSI PDCCH communication. Numerous other aspects are provided.

30 Claims, 5 Drawing Sheets

INDICATING A REFERENCE SIGNAL TRANSMISSION PRIOR TO RMSI PDCCH TRANSMISSION

CROSS-REFERENCE TO RELATED APPLICATION

This Patent Application claims priority to U.S. Provisional Patent Application No. 62/992,815, filed on Mar. 20, 2020, entitled "INDICATING A REFERENCE SIGNAL TRANSMISSION PRIOR TO RMSI PDCCH TRANSMISSION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for indicating a reference signal transmission prior to a remaining minimum system information (RMSI) physical downlink control channel (PDCCH) transmission.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, and/or a 5G Node B, among other examples.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, further improvements in LTE and NR technologies remain useful. Preferably, these improvements should be applicable to other multiple access technologies and the telecommunication standards that employ these technologies.

SUMMARY

In some aspects, a method of wireless communication, performed by a user equipment (UE), may include receiving a physical broadcast channel (PBCH) communication from a base station (BS); identifying, based at least in part on a determination that the PBCH communication indicates a reference signal that is to be transmitted prior to transmission of a remaining minimum system information (RMSI) physical downlink control channel (PDCCH) communication, one or more radio resources in which the reference signal is to be transmitted; and monitoring for the reference signal, from the BS, in the one or more radio resources prior to reception of the RMSI PDCCH communication.

In some aspects, a method of wireless communication, performed by a base station, may include transmitting, to a UE, a PBCH communication that indicates a reference signal that is to be transmitted prior to transmission of a RMSI PDCCH communication; and transmitting, to the UE, the reference signal prior to transmitting the RMSI PDCCH communication to the UE.

In some aspects, a UE for wireless communication may include a memory and one or more processors operatively coupled to the memory. The memory and the one or more processors may be configured to receive a PBCH communication from a BS; identify, based at least in part on a determination that the PBCH communication indicates a reference signal that is to be transmitted prior to transmission of a RMSI PDCCH communication, one or more radio resources in which the reference signal is to be transmitted; and monitor for the reference signal, from the BS, in the one or more radio resources prior to reception of the RMSI PDCCH communication.

In some aspects, a BS for wireless communication may include a memory and one or more processors operatively coupled to the memory. The memory and the one or more processors may be configured to transmit, to a UE, a PBCH communication that indicates a reference signal that is to be transmitted prior to transmission of a RMSI PDCCH communication; and transmit, to the UE, the reference signal prior to transmitting the RMSI PDCCH communication to the UE.

In some aspects, a non-transitory computer-readable medium may store one or more instructions for wireless communication. The one or more instructions, when executed by one or more processors of a UE, may cause the one or more processors to receive a PBCH communication from a BS; identify, based at least in part on a determination that the PBCH communication indicates a reference signal that is to be transmitted prior to transmission of a RMSI PDCCH communication, one or more radio resources in which the reference signal is to be transmitted; and monitor for the reference signal, from the BS, in the one or more radio resources prior to reception of the RMSI PDCCH communication.

In some aspects, a non-transitory computer-readable medium may store one or more instructions for wireless communication. The one or more instructions, when executed by one or more processors of a BS, may cause the one or more processors to transmit, to a UE, a PBCH communication that indicates a reference signal that is to be transmitted prior to transmission of a RMSI PDCCH communication; and transmit, to the UE, the reference signal prior to transmitting the RMSI PDCCH communication to the UE.

In some aspects, an apparatus for wireless communication may include means for receiving a PBCH communication from a BS; means for identifying, based at least in part on a determination that the PBCH communication indicates a reference signal that is to be transmitted prior to transmission of a RMSI PDCCH communication, one or more radio resources in which the reference signal is to be transmitted; and means for monitoring for the reference signal, from the BS, in the one or more radio resources prior to reception of the RMSI PDCCH communication.

In some aspects, an apparatus for wireless communication may include means for transmitting, to a UE, a PBCH communication that indicates a reference signal that is to be transmitted prior to transmission of a RMSI PDCCH communication; and means for transmitting, to the UE, the reference signal prior to transmitting the RMSI PDCCH communication to the UE.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, and/or algorithms (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
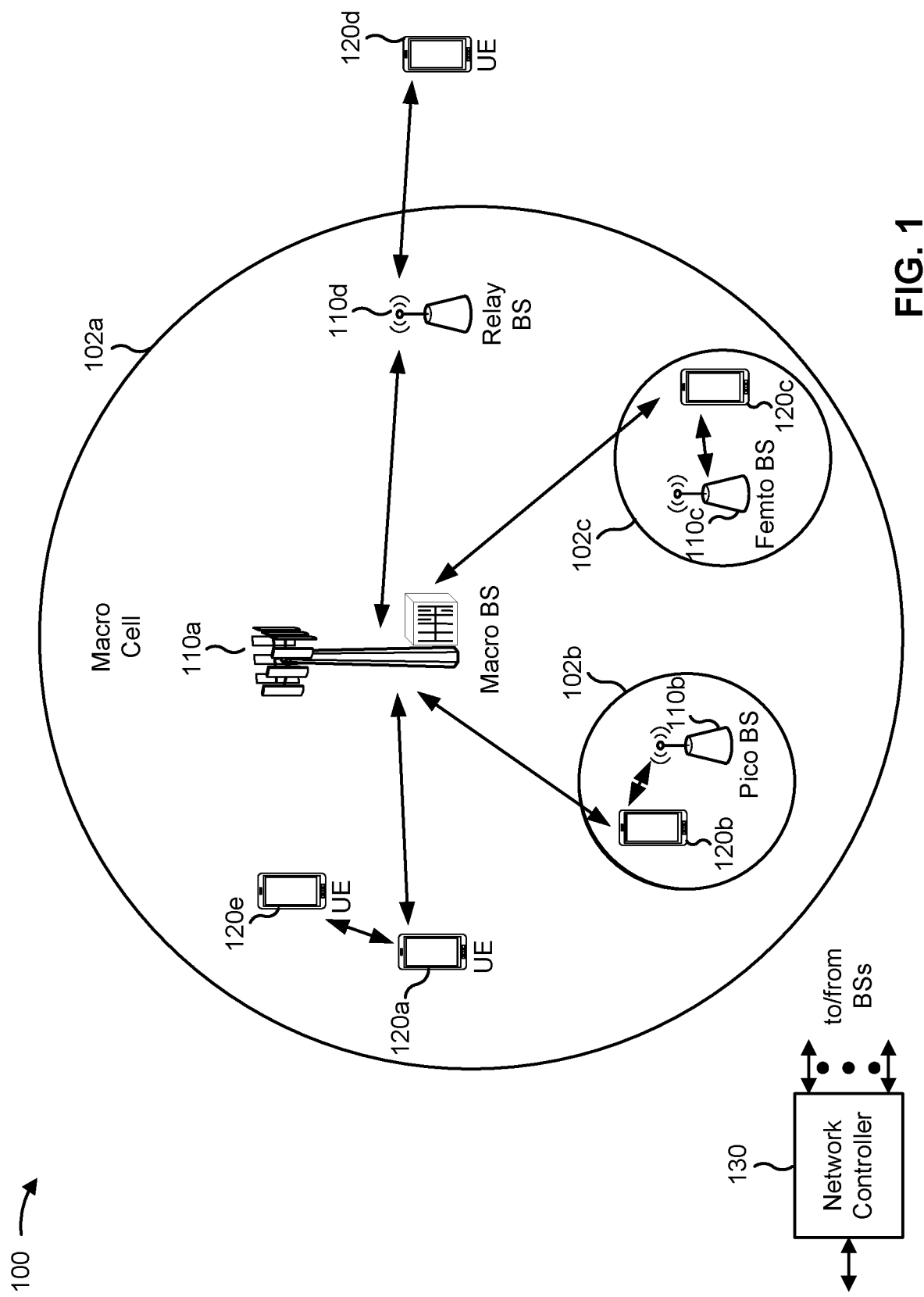
FIG. 1 is a block diagram conceptually illustrating an example of a wireless communication network, in accordance with the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, and/or a transmit receive point (TRP), among other examples. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or another type of backhaul interface using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, or a relay, among other examples.

Wireless network 100 may be a heterogeneous network that includes BSs of different types, e.g., macro BSs, pico BSs, femto BSs, relay BSs, and/or other types of BSs. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, for example, directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, or a station, among other examples. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
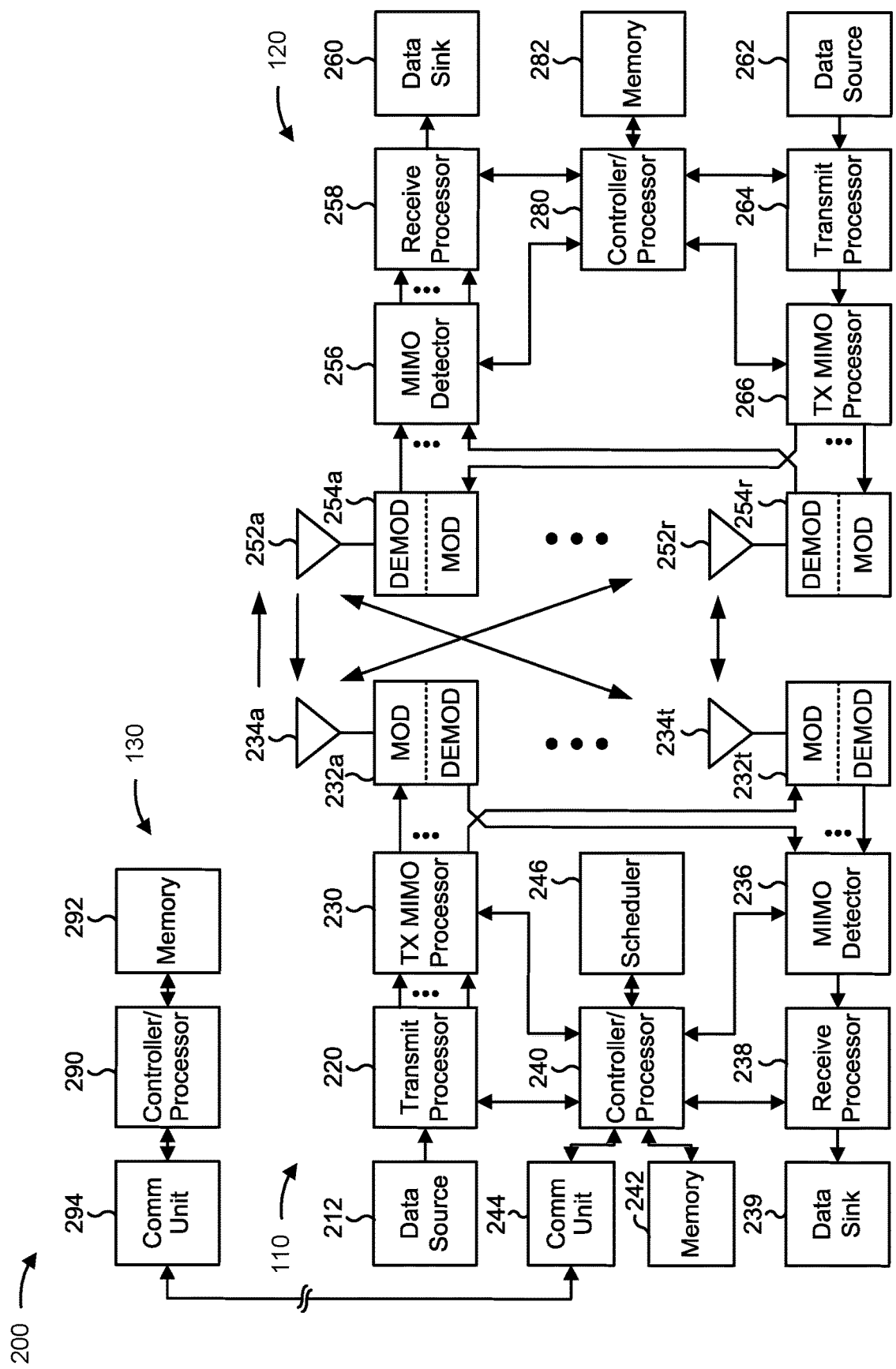
FIG. 2 is a block diagram conceptually illustrating an example of a base station (BS) in communication with a user equipment (UE) in a wireless communication network, in accordance with the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., semi-static resource partitioning information (SRPI)) and control information (e.g., CQI requests, grants, and/or upper layer signaling, among other examples), and may provide overhead symbols and control symbols. Transmit processor 220 may also generate reference symbols for reference signals (e.g., a cell-specific reference signal (CRS), a demodulation reference signal (DMRS)) and synchronization signals (e.g., a primary synchronization signal (PSS) and/or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. In some aspects, a modulator and a demodulator (e.g., MOD/DEMOD 232) of the base station 110 may be included in a modem of the base station 110. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

Controller/processor 240 of base station 110, controller/processor 280 of UE 120, and/or any other component(s) of FIG. 2 may perform one or more techniques associated with indicating a reference signal transmission prior to a remaining minimum system information (RMSI) physical downlink control channel (PDCCH) transmission, as described in more detail elsewhere herein. For example, controller/processor 240 of base station 110, controller/processor 280 of UE 120, and/or any other component(s) of FIG. 2 may perform or direct operations of, for example, the operations illustrated and described below in FIG. 3, process 400 of FIG. 4, process 500 of FIG. 5, and/or other processes as described herein. Memories 242 and 282 may store data and program codes for base station 110 and UE 120, respectively. As such, memory 282 of the UE can comprise a non-transitory computer-readable medium storing one or more instructions for wireless communication, where the one or more instructions comprise one or more instructions that, when executed by one or more processors (e.g., receive processor 258 and/or controller/processor 280) of the UE 120, cause the one or more processors to perform the method described in greater detail with reference to FIGS. 3-5. For example, the one or more instructions, when executed (e.g., directly, or after compiling, converting, interpreting, and/or the like) by one or more processors of the base station 110 and/or the UE 120, may perform or direct operations of, for example, the operations illustrated and described below in FIG. 3, process 400 of FIG. 4, process 500 of FIG. 5, and/or other processes as described herein. In some aspects, executing instructions may include running the instructions, converting the instructions, compiling the instructions, interpreting the instructions, and/or the like. A scheduler 246 may schedule UEs for data transmission on the downlink and/or uplink.

In some aspects, UE 120 may include means for receiving a physical broadcast channel (PBCH) communication from a BS 110 (e.g., using antenna 252, DEMOD 254, MIMO detector 256, receive processor 258, controller/processor 280, memory 282, and/or the like), means for identifying, based at least in part on a determination that the PBCH communication indicates a reference signal that is to be transmitted prior to transmission of a RMSI PDCCH communication, one or more radio resources in which the reference signal is to be transmitted (e.g., using receive processor 258, transmit processor 264, controller/processor 280, memory 282, and/or the like), means for monitoring for the reference signal, from the BS 110, in the one or more radio resources prior to reception of the RMSI PDCCH communication (e.g., using antenna 252, DEMOD 254, MIMO detector 256, receive processor 258, controller/processor 280, memory 282, and/or the like), and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting, to a UE 120, a PBCH communication that indicates a reference signal that is to be transmitted prior to transmission of a RMSI PDCCH communication (e.g., using controller/processor 240, transmit processor 220, TX MIMO processor 230, MOD 232, antenna 234, memory 242, and/or the like), means for transmitting, to the UE 120, the reference signal prior to transmitting the RMSI PDCCH communication to the UE 120 (e.g., using controller/processor 240, transmit processor 220, TX MIMO processor 230, MOD 232, antenna 234, memory 242, and/or the like), and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

A BS may transmit system information to a UE on various physical channels to facilitate initial access and connection establishment with the BS. The BS may broadcast system frame number information, subcarrier spacing information, resource location information for a RMSI PDCCH communication, and/or other types of system information. The UE may receive the PDCCH communication to identify the resources (e.g., the time domain resources and/or the frequency domain resources) for the RMSI PDCCH communication, and may monitor for the RMSI PDCCH communication in the identified resources. The RMSI PDCCH communication may include system information such as system information block 1 (SIB1), which may include cell selection information, a public land mobile network (PLMN) identifier associated with the network in which the BS is included, a cell identifier of the BS, resource location information of other system information (OSI) (e.g., system information block 2 (SIB2) and/or other system information blocks), and/or the like.

The resources in which the BS may transmit the RMSI PDCCH communication may be referred to as a Type 0 PDCCH common search space or control resource set (CORESET) 0 (CORESET0). The BS may transmit the RMSI PDCCH communication in the CORESET0 using a wide transmit beam to provide broad signal coverage in the network for the RMSI PDCCH communication. However, with the rise of millimeter wave (mmWave) communication in 5G NR wireless networks, the use of wide transmit beams may limit beam gain and throughput, which can limit the throughput and latency enhancements of mmWave communication. In some cases, receive beam refinement may be used to increase the gain of a wide transmit beam received at the UE. However, the resources configured for the CORESET0 might not span more than a few orthogonal frequency division multiplexing (OFDM) symbols in the time domain (e.g., 2 or 3 OFDM symbols), which may not provide the UE with sufficient time to perform receive beam refinement to increase the beam gain of the RMSI PDCCH communication.

Some aspects described herein provide techniques and apparatuses for indicating a reference signal transmission prior to a RMSI PDCCH transmission. In some aspects, a BS (e.g., BS 110) transmits a reference signal (e.g., a demodulation reference signal (DMRS), a channel state information reference signal (CSI-RS), or another type of reference signal) prior to transmission of a RMSI PDCCH communication. In this way, a UE (e.g., UE 120) may refine a receive beam based at least in part on measuring the reference signal and may receive the RMSI PDCCH communication using the refined receive beam, which may increase the beam gain and throughput for RMSI PDCCH communications transmitted using a wide transmit beam.

In some aspects, the BS may indicate to the UE whether a reference signal is to be transmitted prior to transmission of a RMSI PDCCH communication. In these cases, the indication of whether a reference signal is to be transmitted prior to transmission of a RMSI PDCCH communication may be included in one or more bit fields in a PBCH communication. The UE may receive the PBCH communication and may determine whether the BS is to transmit the reference signal prior to transmission of the RMSI PDCCH communication based at least in part on the value(s) of the one or more bit fields. Moreover, the UE may identify the resource(s) in which the reference signal is to be transmitted based at least in part on a table, a specification, a standard, and/or other data structures such that the resource(s) do not need to be indicated via additional signaling, which reduces radio resource consumption.

Figure 3:
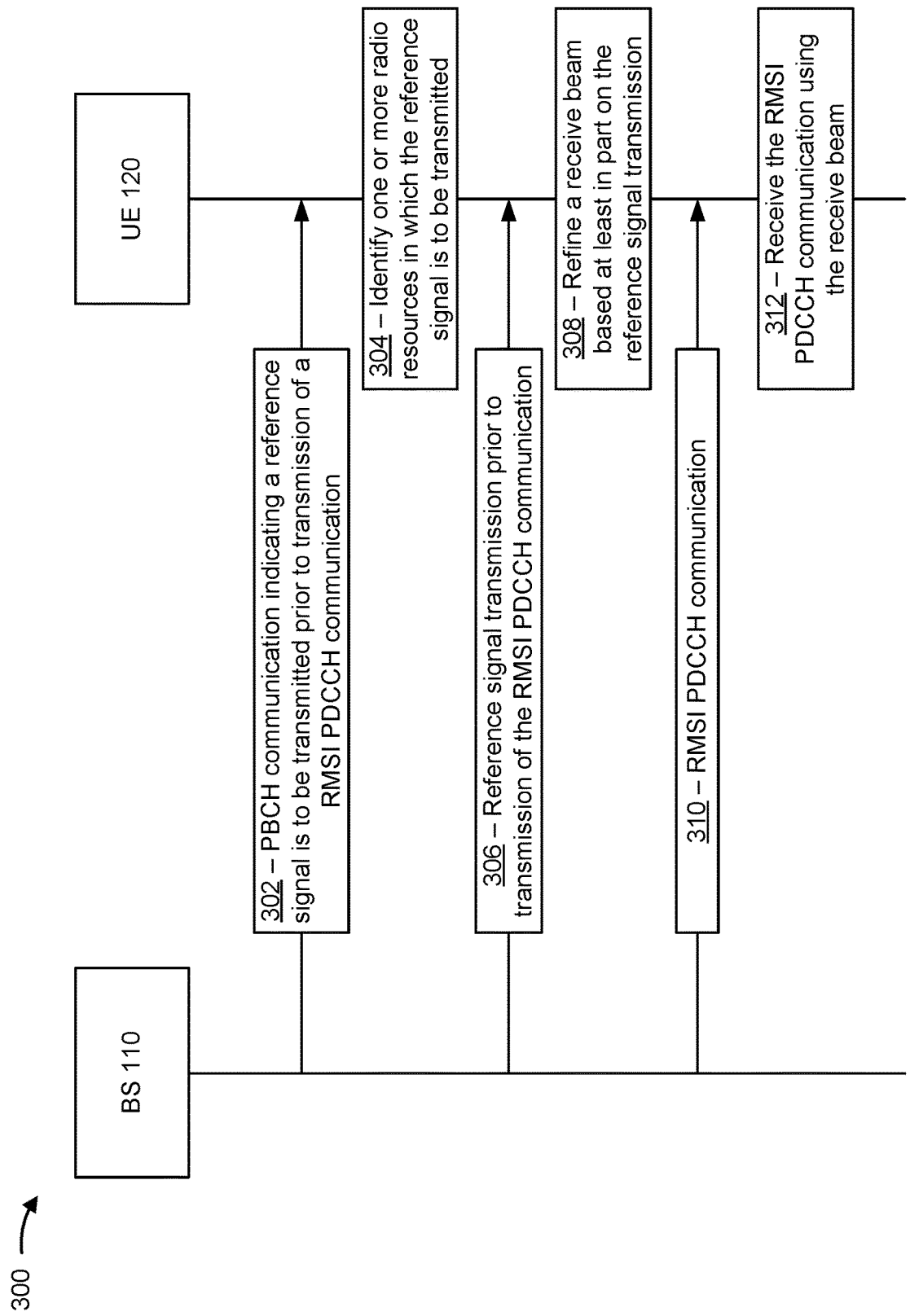
FIG. 3 is a diagram illustrating one or more examples of indicating a reference signal transmission prior to a remaining minimum system information physical downlink control channel transmission, in accordance with the present disclosure.

FIG. 3 is a diagram illustrating one or more examples 300 of indicating a reference signal transmission prior to a RMSI PDCCH transmission, in accordance with the present disclosure. As shown in FIG. 3, example(s) 300 include communication between a BS 110 and a UE 120. In some aspects, the BS 110 and the UE 120 are included in a wireless network, such as wireless network 100. The BS 110 and the UE 120 may communicate via a wireless access link, which may include a downlink and an uplink. In some aspects, the BS 110 and the UE 120 communicate using beams, such as transmit beams, receive beams, and/or the like. Moreover, in some aspects, the BS 110 and the UE 120 communicate on an mmWave frequency, such as a Third Generation Partnership Project (3GPP) Frequency Range 2 (FR2) frequency, a 3GPP Frequency Range 4 (FR4) frequency, and/or the like.

As shown in FIG. 3, and by reference number 302, the BS 110 may transmit a PBCH communication. In some aspects, the BS 110 broadcasts and/or multicasts the PBCH communication to the UE 120 and other UEs in the wireless network. As further shown in FIG. 3, the PBCH communication may indicate that the BS 110 is to transmit a reference signal prior to transmission of a RMSI PDCCH communication. In some aspects, the PBCH communication includes other types of system information, such as a master information block (MIB), an indication of the radio resources (e.g., the time domain resources and/or the frequency domain resources) configured for the Type 0 PDCCH common search space or CORESET0 in which the RMSI PDCCH communication is to be transmitted, and/or the like.

The reference signal may include a CSI-RS, a DMRS, or another type of reference signal. In some aspects, the BS 110 schedules the reference signal (e.g., a CSI-RS) prior to transmitting the PBCH communication, such as in an access link implementation in which the BS 110 schedules communications on a downlink and/or on an uplink associated with the UE 120. This may be referred to as a BS-scheduled reference signal. In some aspects, the BS 110 does not schedule the reference signal prior to transmitting the PBCH communication, such as in a sidelink implementation in which the UE 120 coordinates communications with other UEs on the sidelink. This may be referred to as a non-BS-scheduled reference signal.

In some aspects, an indication of transmission of the reference signal prior to transmission of the RMSI PDCCH communication is included in a bit field in the PBCH communication. The BS 110 may configure the bit field to include a one-bit flag or value that, if set, indicates transmission of the reference signal prior to transmission of the RMSI PDCCH communication. In these cases, the UE 120 may determine that the BS 110 is to transmit the reference signal prior to transmission of the RMSI PDCCH communication based at least in part on the one-bit flag or value in the bit field.

In some aspects, the BS 110 may configure one or more bit fields, in the PBCH communication, that are used to indicate other types of information to indicate whether the reference signal is to be transmitted prior to transmission of the RMSI PDCCH communication. For example, the UE 120 may determine whether the BS 110 is to transmit the reference signal prior to transmission of the RMSI PDCCH communication based at least in part on the value(s) of the bit field(s) for configuring the Type 0 PDCCH common search space or CORESET0 (e.g., for configuring the radio resources for the Type 0 PDCCH common search space or CORESET0). In these cases, a value in a bit field for configuring the Type 0 PDCCH common search space or CORESET0 may provide an index, for example, for a Type 0 PDCCH common search space table, a specification, a standard, or another type of data structure (e.g., may provide an index for a particular row or column of the Type 0 PDCCH common search space table). The row or the column into which the value of the bit field indexes may include an additional field indicating whether the BS 110 is to transmit the reference signal prior to transmission of the RMSI PDCCH communication. Accordingly, the UE 120 may determine whether the BS 110 is to transmit the reference signal prior to transmission of the RMSI PDCCH communication by identifying the value of the bit field for configuring the Type 0 PDCCH common search space or CORESET0, identifying the row or the column of the Type 0 PDCCH common search space table associated with the value of the bit field, and determining whether the field in the row or the column indicates that the BS 110 is to transmit the reference signal prior to transmission of the RMSI PDCCH communication.

As further shown in FIG. 3, and by reference number 304, the UE 120 may identify one or more radio resources in which the reference signal is to be transmitted. In some aspects, the UE 120 identifies the one or more radio resources based at least in part on determining that the BS 110 is to transmit the reference signal prior to transmission of the RMSI PDCCH communication. The one or more radio resources may be indicated in a table, a specification, a standard, and/or another data structure.

In some aspects, the UE 120 identifies the one or more radio resources based at least in part on the configuration of the Type 0 PDCCH common search space or CORESET0 in which the RMSI PDCCH communication is to be transmitted. For example, the Type 0 PDCCH common search space table may indicate one or more parameters for the Type 0 PDCCH common search space or CORESET0, such as the radio resources for the Type 0 PDCCH common search space or CORESET0, a multiplexing pattern for the Type 0 PDCCH common search space or CORESET0, a frequency range (e.g., FR2) for the Type 0 PDCCH common search space or CORESET0, and/or the like. In these cases, the UE 120 may identify the one or more radio resources for the reference signal based at least in part on a mapping, indicated in the table, the specification, the standard, and/or another data structure, between the particular combination of the one or more parameters and the radio resources for the reference signal.

As further shown in FIG. 3, and by reference number 306, the BS 110 may transmit the reference signal prior to transmission of the RMSI PDCCH communication. In these cases, the PBCH communication indicates that the BS 110 is to transmit the reference signal prior to transmission of the RMSI PDCCH communication. The BS 110 may transmit the reference signal in one or more radio resources configured for transmission of the reference signal. The UE 120 may monitor for the reference signal in the one or more radio resources based at least in part on identifying the one or more radio resources.

As further shown in FIG. 3, and by reference number 308, the UE 120 may refine a receive beam of the UE 120 based at least in part on the reference signal transmission. In these cases, the UE 120 may perform one or more measurements of the reference signal, such as one or more RSRP measurements, one or more RSSI measurements, one or more RSRQ measurements, one or more CQI measurements, and/or other types of radio signal measurements. The UE 120 may refine the receive beam of the UE 120 by configuring one or more beam weighting coefficients based at least in part on the one or more measurements, by selecting a particular receive beam based at least in part on the one or more measurements, by selecting a particular combination of receive beams based at least in part on the one or more measurements, and/or other techniques to refine the receive beam(s) that are to be used for receiving the RMSI PDCCH communication.

As further shown in FIG. 3, and by reference number 310, the BS 110 may transmit the RMSI PDCCH communication after transmitting the reference signal. The BS 110 may transmit the RMSI PDCCH communication in the radio resources configured for the Type 0 PDCCH common search space or CORESET0 indicated by the PBCH communication.

As further shown in FIG. 3, and by reference number 312, the UE 120 may receive the RMSI PDCCH communication using the receive beam (e.g., the receive beam that was refined based at least in part on the one or more measurements of the reference signal transmitted from the BS 110). The UE 120 may identify system information in the RMSI PDCCH communication, such as SIB1 and/or other types of system information. The UE 120 may use the system information included in the RMSI PDCCH communication for various purposes, such as to perform a random access channel (RACH) procedure with the BS 110 to establish a communicative connection with the BS 110.

In this way, the BS 110 transmits a reference signal prior to transmission of a RMSI PDCCH communication. The UE 120 may refine a receive beam based at least in part on measuring the reference signal and may receive the RMSI PDCCH communication using the refined receive beam, which may increase the beam gain and throughput for RMSI PDCCH communications transmitted using a wide transmit beam.

As indicated above, FIG. 3 is provided as one or more examples. Other examples may differ from what is described with respect to FIG. 3.

Figure 4:
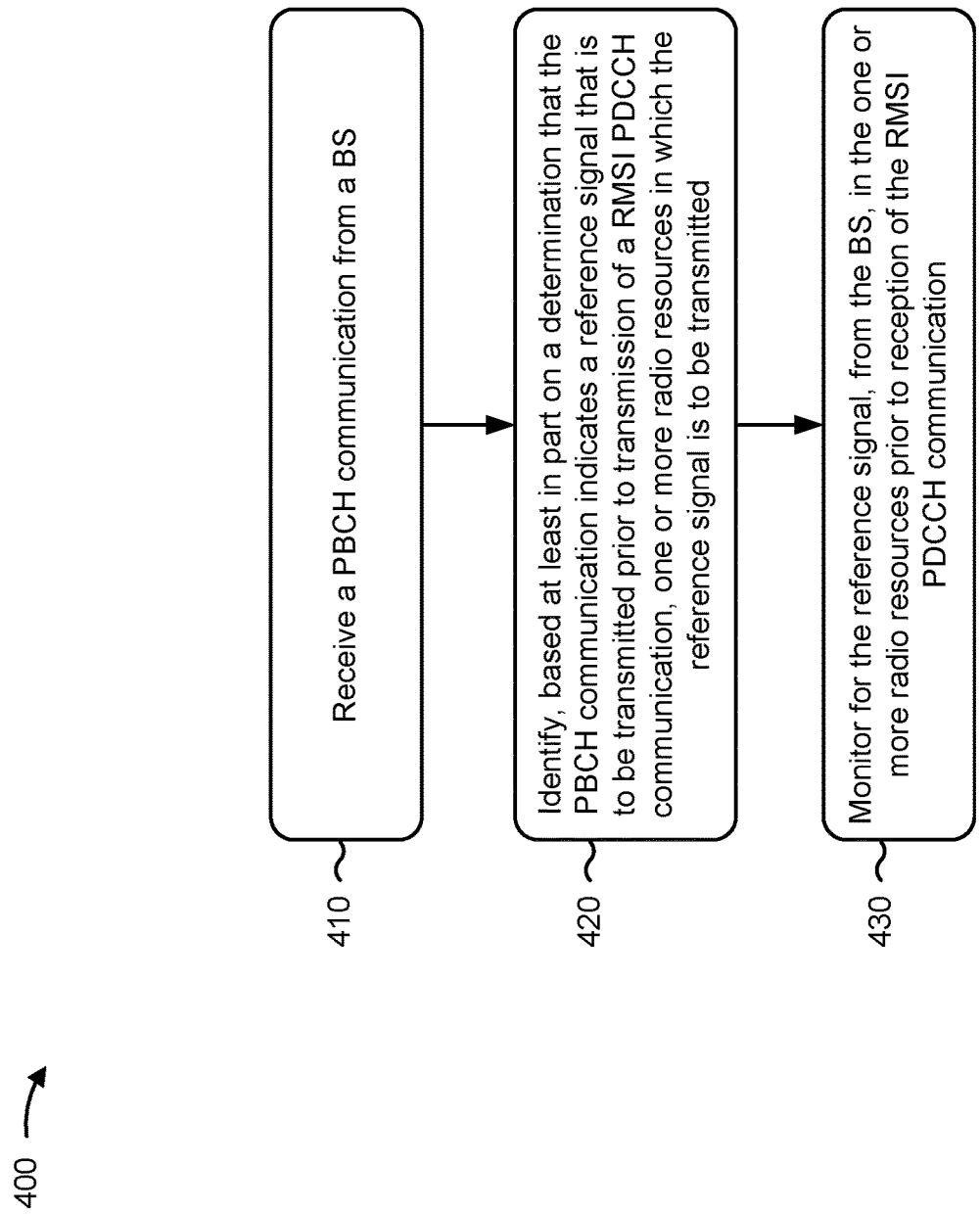
FIG. 4 is a diagram illustrating an example process performed, for example, by a UE, in accordance with the present disclosure.

FIG. 4 is a diagram illustrating an example process 400 performed, for example, by a UE, in accordance with the present disclosure. Example process 400 is an example where the UE (e.g., UE 120 illustrated and described above in connection with one or more of FIGS. 1-3) performs operations associated with indicating a reference signal transmission prior to a RMSI PDCCH transmission.

As shown in FIG. 4, in some aspects, process 400 may include receiving a PBCH communication from a BS (block 410). For example, the UE (e.g., using antenna 252, DEMOD 254, MIMO detector 256, receive processor 258, controller/processor 280, memory 282, and/or the like) may receive a PBCH communication from a BS, as described above in connection with FIG. 3.

As further shown in FIG. 4, in some aspects, process 400 may include identifying, based at least in part on a determination that the PBCH communication indicates a reference signal that is to be transmitted prior to transmission of a RMSI PDCCH communication, one or more radio resources in which the reference signal is to be transmitted (block 420). For example, the UE (e.g., using receive processor 258, transmit processor 264, controller/processor 280, memory 282, and/or the like) may identify, based at least in part on a determination that the PBCH communication indicates a reference signal that is to be transmitted prior to transmission of a RMSI PDCCH communication, one or more radio resources in which the reference signal is to be transmitted, as described above in connection FIG. 3.

As further shown in FIG. 4, in some aspects, process 400 may include monitoring for the reference signal, from the BS, in the one or more radio resources prior to reception of the RMSI PDCCH communication (block 430). For example, the UE (e.g., using antenna 252, DEMOD 254, MIMO detector 256, receive processor 258, controller/processor 280, memory 282, and/or the like) may monitor for the reference signal, from the BS, in the one or more radio resources prior to reception of the RMSI PDCCH communication, as described above in connection FIG. 3.

Process 400 may include additional aspects, such as any single aspect or any combination of aspects described below and/or in connection with one or more other processes described elsewhere herein.

In a first aspect, the reference signal comprises a CSI-RS or a DMRS. In a second aspect, alone or in combination with the first aspect, process 400 includes performing one or more measurements of the reference signal based at least in part on monitoring for the reference signal in the one or more radio resources prior to reception of the RMSI PDCCH communication, and refining a receive beam of the UE for reception of the RMSI PDCCH communication. In a third aspect, alone or in combination with one or more of the first and second aspects, process 400 includes determining that the PBCH communication indicates the reference signal is to be transmitted prior to transmission of the RMSI PDCCH communication based at least in part on a bit field, in the PBCH communication, that includes a one-bit flag indicating that the reference signal is to be transmitted prior to transmission of the RMSI PDCCH communication.

In a fourth aspect, alone or in combination with one or more of the first through third aspects, identifying the one or more radio resources in which the reference signal is to be transmitted comprises identifying the one or more radio resources based at least in part on an indication of the one or more radio resources in at least one of: a table, a specification, or a standard. In a fifth aspect, alone or in combination with one or more of the first through fourth aspects, identifying the one or more radio resources in which the reference signal is to be transmitted comprises identifying the indication of the one or more radio resources based at least in part on a configuration of a CORESET in which the RMSI PDCCH communication is to be transmitted. In a sixth aspect, alone or in combination with one or more of the first through fifth aspects, process 400 includes determining that the PBCH communication indicates the reference signal is to be transmitted prior to transmission of the RMSI PDCCH communication based at least in part on a bit field, in the PBCH communication, for configuration of a CORESET in which the RMSI PDCCH communication is to be transmitted.

In a seventh aspect, alone or in combination with one or more of the first through sixth aspects, a value indicated in the bit field may provide an index for lookup in a Type 0 PDCCH common search space table, and determining that the PBCH communication indicates the reference signal is to be transmitted prior to transmission of the RMSI PDCCH communication comprises determining that a row or a column of the Type 0 PDCCH common search space table, associated with the value indicated in the bit field, indicates the reference signal is to be transmitted prior to transmission of the RMSI PDCCH communication. In an eighth aspect, alone or in combination with one or more of the first through seventh aspects, identifying the one or more radio resources in which the reference signal is to be transmitted comprises identifying the one or more radio resources based at least in part on one or more parameters of a Type 0 PDCCH common search configuration indicated in the row or the column associated with the value indicated in the bit field.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
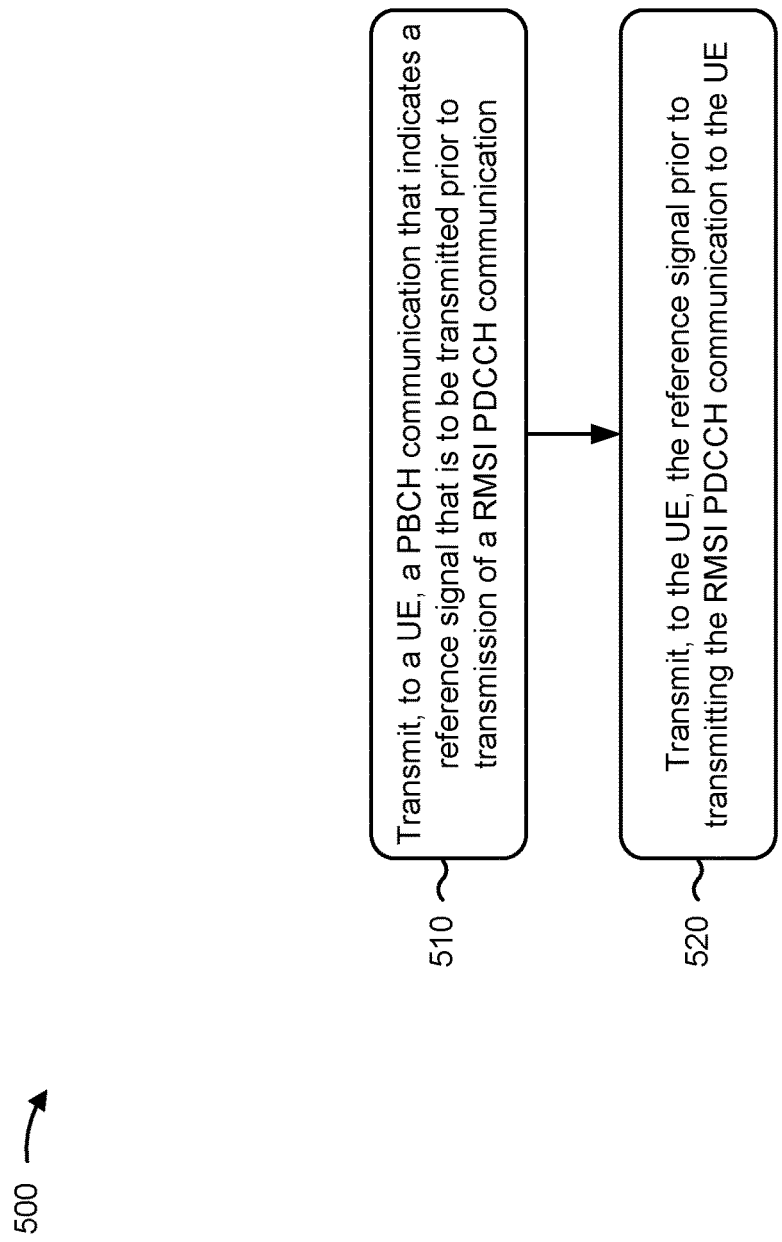
FIG. 5 is a diagram illustrating an example process performed, for example, by a BS, in accordance with the present disclosure.

FIG. 5 is a diagram illustrating an example process 500 performed, for example, by a BS, in accordance with the present disclosure. Example process 500 is an example where the BS (e.g., BS 110 illustrated and described above in connection with one or more of FIGS. 1-3) performs operations associated with indicating a reference signal transmission prior to a RMSI PDCCH transmission.

As shown in FIG. 5, in some aspects, process 500 may include transmitting, to a UE, a PBCH communication that indicates a reference signal that is to be transmitted prior to transmission of a RMSI PDCCH communication (block 510). For example, the BS (e.g., using controller/processor 240, transmit processor 220, TX MIMO processor 230, MOD 232, antenna 234, memory 242, and/or the like) may transmit, to a UE, a PBCH communication that indicates a reference signal that is to be transmitted prior to transmission of a RMSI PDCCH communication, as described above in connection with FIG. 3.

As further shown in FIG. 5, in some aspects, process 500 may include transmitting, to the UE, the reference signal prior to transmitting the RMSI PDCCH communication to the UE (block 520). For example, the BS (e.g., using controller/processor 240, transmit processor 220, TX MIMO processor 230, MOD 232, antenna 234, memory 242, and/or the like) may transmit, to the UE, the reference signal prior to transmitting the RMSI PDCCH communication to the UE, as described above in connection with FIG. 3.

Process 500 may include additional aspects, such as any single aspect or any combination of aspects described below and/or in connection with one or more other processes described elsewhere herein.

In a first aspect, the reference signal comprises a CSI-RS or a DMRS. In a second aspect, alone or in combination with the first aspect, process 500 includes configuring a bit field, in the PBCH communication, to include a one-bit flag indicating that the reference signal is to be transmitted prior to transmission of the RMSI PDCCH communication. In a third aspect, alone or in combination with one or more of the first and second aspects, transmitting the reference signal comprises transmitting the reference signal in one or more radio resources identified in at least one of: a table, a specification, or a standard.

In a fourth aspect, alone or in combination with one or more of the first through third aspects, the one or more radio resources are based at least in part on a configuration of a CORESET in which the RMSI PDCCH communication is to be transmitted. In a fifth aspect, alone or in combination with one or more of the first through fourth aspects, process 500 includes configuring a bit field, in the PBCH communication, for configuration of a CORESET in which the RMSI PDCCH communication is to be transmitted to indicate that the reference signal is to be transmitted prior to transmission of the RMSI PDCCH communication.

In a sixth aspect, alone or in combination with one or more of the first through fifth aspects, a value indicated in the bit field may provide an index for a Type 0 PDCCH common search space table, and a row or a column of the Type 0 PDCCH common search space table, associated with the value indicated in the bit field, indicates the reference signal is to be transmitted prior to transmission of the RMSI PDCCH communication. In a seventh aspect, alone or in combination with one or more of the first through sixth aspects, transmitting the reference signal comprises: transmitting the reference signal in one or more radio resources that are based at least in part on one or more parameters of a Type 0 PDCCH common search configuration indicated in the row or the column associated with the value indicated in the bit field.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the aspects to the precise forms disclosed. Modifications and variations may be made in light of the above disclosure or may be acquired from practice of the aspects.

The following provides an overview of some aspects of the present disclosure:

Aspect 1: A method of wireless communication performed by a user equipment (UE), comprising: receiving a physical broadcast channel (PBCH) communication from a base station (BS); identifying, based at least in part on a determination that the PBCH communication indicates a reference signal that is to be transmitted prior to transmission of a remaining minimum system information (RMSI) physical downlink control channel (PDCCH) communication, one or more radio resources in which the reference signal is to be transmitted; and monitoring for the reference signal, from the BS, in the one or more radio resources prior to reception of the RMSI PDCCH communication.

Aspect 2: The method of aspect 1, wherein the reference signal comprises: a channel state information reference signal (CSI-RS), or a demodulation reference signal (DMRS). Aspect 3: The method of aspect 1 or 2, further comprising: performing one or more measurements of the reference signal based at least in part on monitoring for the reference signal in the one or more radio resources prior to reception of the RMSI PDCCH communication; and refining a receive beam of the UE for reception of the RMSI PDCCH communication. Aspect 4: The method of any of aspects 1-3, further comprising: determining that the PBCH communication indicates the reference signal is to be transmitted prior to transmission of the RMSI PDCCH communication based at least in part on a bit field, in the PBCH communication, that includes a one-bit flag indicating that the reference signal is to be transmitted prior to transmission of the RMSI PDCCH communication.

Aspect 5: The method of any of aspects 1-4, wherein the reference signal comprises a channel state information reference signal (CSI-RS) that is scheduled by the BS. Aspect 6: The method of any of aspects 1-5, wherein identifying the one or more radio resources in which the reference signal is to be transmitted comprises: identifying the indication of the one or more radio resources based at least in part on a configuration of a control resource set (CORESET) in which the RMSI PDCCH communication is to be transmitted.

Aspect 7: The method of any of aspects 1-6, further comprising: determining that the PBCH communication indicates the reference signal is to be transmitted prior to transmission of the RMSI PDCCH communication based at least in part on a bit field, in the PBCH communication, for configuration of a control resource set (CORESET) in which the RMSI PDCCH communication is to be transmitted. Aspect 8: The method of aspect 7, wherein a value indicated in the bit field provides an index for a Type 0 PDCCH common search space table; and wherein determining that the PBCH communication indicates the reference signal is to be transmitted prior to transmission of the RMSI PDCCH communication comprises: determining that a row or a column of the Type 0 PDCCH common search space table, associated with the value indicated in the bit field, indicates the reference signal is to be transmitted prior to transmission of the RMSI PDCCH communication. Aspect 9: The method of aspect 8, wherein identifying the one or more radio resources in which the reference signal is to be transmitted comprises: identifying the one or more radio resources based at least in part on one or more parameters of a Type 0 PDCCH common search configuration indicated in the row or the column associated with the value indicated in the bit field.

Aspect 10: A method of wireless communication performed by a base station (BS), comprising: transmitting, to a user equipment (UE), a physical broadcast channel (PBCH) communication that indicates a reference signal that is to be transmitted prior to transmission of a remaining minimum system information (RMSI) physical downlink control channel (PDCCH) communication; and transmitting, to the UE, the reference signal prior to transmitting the RMSI PDCCH communication to the UE.

Aspect 11: The method of aspect 10, wherein the reference signal comprises: a channel state information reference signal (CSI-RS), or a demodulation reference signal (DMRS). Aspect 12: The method of aspect 10 or 11, further comprising: configuring a bit field, in the PBCH communication, to include a one-bit flag indicating that the reference signal is to be transmitted prior to transmission of the RMSI PDCCH communication.

Aspect 13: The method of any of aspects 10-12, wherein transmitting the reference signal comprises: transmitting the reference signal in one or more radio resources identified in at least one of: a table, a specification, or a standard, and wherein the one or more radio resources are based at least in part on a configuration of a control resource set (CORESET) in which the RMSI PDCCH communication is to be transmitted. Aspect 14: The method of aspect 13, wherein the one or more radio resources are based at least in part on a configuration of a control resource set (CORESET) in which the RMSI PDCCH communication is to be transmitted.

Aspect 15: The method of any of aspects 10-14, wherein the reference signal comprises a channel state information reference signal (CSI-RS) that is scheduled by the BS. Aspect 16: The method of aspect 15, wherein a value indicated in the bit field provides an index a Type 0 PDCCH common search space table; and wherein a row or a column of the Type 0 PDCCH common search space table, associated with the value indicated in the bit field, indicates the reference signal is to be transmitted prior to transmission of the RMSI PDCCH communication. Aspect 17: The method of aspect 16, wherein transmitting the reference signal comprises: transmitting the reference signal in one or more radio resources that are based at least in part on one or more parameters of a Type 0 PDCCH common search configuration indicated in the row or the column associated with the value indicated in the bit field.

Aspect 18: An apparatus for wireless communication at a device, comprising a processor; memory coupled with the processor; and instructions stored in the memory and executable by the processor to cause the apparatus to perform the method of one or more aspects of aspects 1-9. Aspect 19: A device for wireless communication, comprising a memory and one or more processors coupled to the memory, the memory and the one or more processors configured to perform the method of one or more aspects of aspects 1-9.

Aspect 20: An apparatus for wireless communication, comprising at least one means for performing the method of one or more aspects of aspects 1-9. Aspect 21: A non-transitory computer-readable medium storing code for wireless communication, the code comprising instructions executable by a processor to perform the method of one or more aspects of aspects 1-9. Aspect 22: A non-transitory computer-readable medium storing a set of instructions for wireless communication, the set of instructions comprising one or more instructions that, when executed by one or more processors of a device, cause the device to perform the method of one or more aspects of aspects 1-9.

Aspect 23: An apparatus for wireless communication at a device, comprising a processor; memory coupled with the processor; and instructions stored in the memory and executable by the processor to cause the apparatus to perform the method of one or more aspects of aspects 10-17. Aspect 24: A device for wireless communication, comprising a memory and one or more processors coupled to the memory, the memory and the one or more processors configured to perform the method of one or more aspects of aspects 10-17.

Aspect 25: An apparatus for wireless communication, comprising at least one means for performing the method of one or more aspects of aspects 10-17. Aspect 26: A non-transitory computer-readable medium storing code for wireless communication, the code comprising instructions executable by a processor to perform the method of one or more aspects of aspects 10-17. Aspect 27: A non-transitory computer-readable medium storing a set of instructions for wireless communication, the set of instructions comprising one or more instructions that, when executed by one or more processors of a device, cause the device to perform the method of one or more aspects of aspects 10-17.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving a physical broadcast channel (PBCH) communication from a base station (BS);
   identifying, based at least in part on a determination that the PBCH communication indicates a reference signal that is to be transmitted prior to transmission of a remaining minimum system information (RMSI) physical downlink control channel (PDCCH) communication, one or more radio resources in which the reference signal is to be transmitted;
   monitoring for the reference signal, from the BS, in the one or more radio resources prior to reception of the RMSI PDCCH communication,
   performing one or more measurements of the reference signal based at least in part on monitoring for the reference signal in the one or more radio resources prior to reception of the RMSI PDCCH communication; and
   refining a receive beam of the UE for reception of the RMSI PDCCH communication.

2. The method of claim 1, wherein the reference signal comprises:
   a channel state information reference signal (CSI-RS), or
   a demodulation reference signal (DMRS).

3. The method of claim 1, further comprising:
   determining that the PBCH communication indicates the reference signal is to be transmitted prior to transmission of the RMSI PDCCH communication based at least in part on a bit field, in the PBCH communication, that includes a one-bit flag indicating that the reference signal is to be transmitted prior to transmission of the RMSI PDCCH communication.

4. The method of claim 1, wherein the reference signal comprises a channel state information reference signal (CSI-RS) that is scheduled by the BS.

5. The method of claim 1, wherein identifying the one or more radio resources in which the reference signal is to be transmitted comprises:
   identifying the indication of the one or more radio resources based at least in part on a configuration of a control resource set (CORESET) in which the RMSI PDCCH communication is to be transmitted.

6. The method of claim 1, further comprising:
   determining that the PBCH communication indicates the reference signal is to be transmitted prior to transmission of the RMSI PDCCH communication based at least in part on a bit field, in the PBCH communication, for configuration of a control resource set (CORESET) in which the RMSI PDCCH communication is to be transmitted.

7. The method of claim 6, wherein a value indicated in the bit field provides an index for a Type 0 PDCCH common search space table; and
   wherein determining that the PBCH communication indicates the reference signal is to be transmitted prior to transmission of the RMSI PDCCH communication comprises:
   determining that a row or a column of the Type 0 PDCCH common search space table, associated with the value indicated in the bit field, indicates the reference signal is to be transmitted prior to transmission of the RMSI PDCCH communication.

8. The method of claim 7, wherein identifying the one or more radio resources in which the reference signal is to be transmitted comprises:
   identifying the one or more radio resources based at least in part on one or more parameters of a Type 0 PDCCH common search configuration indicated in the row or the column associated with the value indicated in the bit field.

9. A method of wireless communication performed by a base station (BS), comprising:
   transmitting, to a user equipment (UE), a physical broadcast channel (PBCH) communication that indicates a reference signal that is to be transmitted prior to transmission of a remaining minimum system information (RMSI) physical downlink control channel (PDCCH) communication; and
   transmitting, to the UE, the reference signal prior to transmitting the RMSI PDCCH communication to the UE, wherein the reference signal is transmitted in one or more radio resources that are based at least in part on a configuration of a control resource set (CORESET) in which the RMSI PDCCH communication is to be transmitted.

10. The method of claim 9, wherein the reference signal comprises:
    a channel state information reference signal (CSI-RS), or
    a demodulation reference signal (DMRS).

11. The method of claim 9, further comprising:
    configuring a bit field, in the PBCH communication, to include a one-bit flag indicating that the reference signal is to be transmitted prior to transmission of the RMSI PDCCH communication.

12. The method of claim 9, wherein the one or more radio resources are identified in at least one of:
    a table,
    a specification, or
    a standard.

13. The method of claim 9, wherein the reference signal comprises a channel state information reference signal (CSI-RS) that is scheduled by the BS.

14. The method of claim 9, further comprising:
    configuring a bit field, in the PBCH communication, for configuration of the CORESET in which the RMSI PDCCH communication is to be transmitted to indicate that the reference signal is to be transmitted prior to transmission of the RMSI PDCCH communication.

15. The method of claim 14, wherein a value indicated in the bit field provides an index of a Type 0 PDCCH common search space table; and
  wherein a row or a column of the Type 0 PDCCH common search space table, associated with the value indicated in the bit field, indicates the reference signal is to be transmitted prior to transmission of the RMSI PDCCH communication.

16. The method of claim 15, wherein the one or more radio resources are based at least in part on one or more parameters of a Type 0 PDCCH common search configuration indicated in the row or the column associated with the value indicated in the bit field.

17. A user equipment (UE) for wireless communication, comprising:
  a memory; and
  one or more processors coupled to the memory, the one or more processors configured to:
    receive a physical broadcast channel (PBCH) communication from a base station (BS);
    identify, based at least in part on a determination that the PBCH communication indicates a reference signal that is to be transmitted prior to transmission of a remaining minimum system information (RMSI) physical downlink control channel (PDCCH) communication, one or more radio resources in which the reference signal is to be transmitted;
    monitor for the reference signal, from the BS, in the one or more radio resources prior to reception of the RMSI PDCCH communication;
    perform one or more measurements of the reference signal based at least in part on monitoring for the reference signal in the one or more radio resources prior to reception of the RMSI PDCCH communication; and
    refine a receive beam of the UE for reception of the RMSI PDCCH communication.

18. The UE of claim 17, wherein the one or more processors are further configured to:
  determine that the PBCH communication indicates the reference signal is to be transmitted prior to transmission of the RMSI PDCCH communication based at least in part on a bit field, in the PBCH communication, that includes a one-bit flag indicating that the reference signal is to be transmitted prior to transmission of the RMSI PDCCH communication.

19. The UE of claim 18, wherein the one or more processors, when identifying the one or more radio resources in which the reference signal is to be transmitted, are configured to:
  identify the indication of the one or more radio resources based at least in part on a configuration of a control resource set (CORESET) in which the RMSI PDCCH communication is to be transmitted.

20. The UE of claim 17, wherein the one or more processors are further configured to:
  determine that the PBCH communication indicates the reference signal is to be transmitted prior to transmission of the RMSI PDCCH communication based at least in part on a bit field, in the PBCH communication, for configuration of a control resource set (CORESET) in which the RMSI PDCCH communication is to be transmitted.

21. The UE of claim 20, wherein a value indicated in the bit field provides an index for a Type 0 PDCCH common search space table; and
  wherein the one or more processors, when determining that the PBCH communication indicates the reference signal is to be transmitted prior to transmission of the RMSI PDCCH communication, are configured to:
    determine that a row or a column of the Type 0 PDCCH common search space table, associated with the value indicated in the bit field, indicates the reference signal is to be transmitted prior to transmission of the RMSI PDCCH communication.

22. The UE of claim 21, wherein the one or more processors, when identifying the one or more radio resources in which the reference signal is to be transmitted, are configured to:
  identify the one or more radio resources based at least in part on one or more parameters of a Type 0 PDCCH common search configuration indicated in the row or the column associated with the value indicated in the bit field.

23. A base station (BS) for wireless communication, comprising:
  a memory; and
  one or more processors coupled to the memory, the one or more processors configured to:
    transmit, to a user equipment (UE), a physical broadcast channel (PBCH) communication that indicates a reference signal that is to be transmitted prior to transmission of a remaining minimum system information (RMSI) physical downlink control channel (PDCCH) communication; and
    transmit, to the UE, the reference signal prior to transmitting the RMSI PDCCH communication to the UE, wherein the reference signal is transmitted in one or more radio resources that are based at least in part on a configuration of a control resource set (CORESET) in which the RMSI PDCCH communication is to be transmitted.

24. The BS of claim 23, wherein the one or more processors are further configured to:
  configure a bit field, in the PBCH communication, to include a one-bit flag indicating that the reference signal is to be transmitted prior to transmission of the RMSI PDCCH communication.

25. The BS of claim 23, wherein the one or more processors are further configured to:
  configure a bit field, in the PBCH communication, for configuration of the CORESET to indicate that the reference signal is to be transmitted prior to transmission of the RMSI PDCCH communication.

26. The BS of claim 25, wherein a value indicated in the bit field provides an index of a Type 0 PDCCH common search space table; and
  wherein a row or a column of the Type 0 PDCCH common search space table, associated with the value indicated in the bit field, indicates the reference signal is to be transmitted prior to transmission of the RMSI PDCCH communication.

27. The BS of claim 26, wherein the one or more radio resources are based at least in part on one or more parameters of a Type 0 PDCCH common search configuration indicated in the row or the column associated with the value indicated in the bit field.

28. The BS of claim 23, wherein the reference signal comprises:
  a channel state information reference signal (CSI-RS), or
  a demodulation reference signal (DMRS).

29. The BS of claim 23, wherein the reference signal comprises a channel state information reference signal (CSI-RS) that is scheduled by the BS.

30. The BS of claim 23, wherein the one or more resources are identified in a table, a specification, a standard, or a combination thereof.

* * * * *